(12) United States Patent
Minabe et al.

(10) Patent No.: US 7,808,877 B2
(45) Date of Patent: Oct. 5, 2010

(54) OPTICAL RECORDING DEVICE AND OPTICAL RECORDING METHOD

(75) Inventors: Jiro Minabe, Kanagawa (JP); Yasuhiro Ogasawara, Minamiashigara (JP); Hisae Yoshizawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 240 days.

(21) Appl. No.: 12/193,062

(22) Filed: Aug. 18, 2008

(65) Prior Publication Data
US 2009/0168631 A1  Jul. 2, 2009

(30) Foreign Application Priority Data
Dec. 26, 2007 (JP) ............................. 2007-334905

(51) Int. Cl.
*G11B 7/00* (2006.01)
(52) U.S. Cl. ...................................... 369/103
(58) Field of Classification Search .................. 369/103
See application file for complete search history.

(56) References Cited

U.S. PATENT DOCUMENTS
6,898,167 B2 * 5/2005 Liu et al. ..................... 369/103
2007/0153663 A1  7/2007 Fukumoto et al.

FOREIGN PATENT DOCUMENTS
JP  2007-079439 A  3/2007

* cited by examiner

*Primary Examiner*—Nabil Z Hindi
(74) *Attorney, Agent, or Firm*—Sughrue Mion, PLLC

(57) ABSTRACT

An optical recording device includes a light source, a light-converging optical system, a moving unit, detection unit, and an acquisition unit. In the optical recording device, interference fringes from a recording light are shift multi-recorded as a plurality of pages of holograms within each of a plurality of planes corresponding to a plurality of convergence positions based on light exposure amount of each page, acquired by the acquisition unit, for each of the convergence positions.

8 Claims, 17 Drawing Sheets

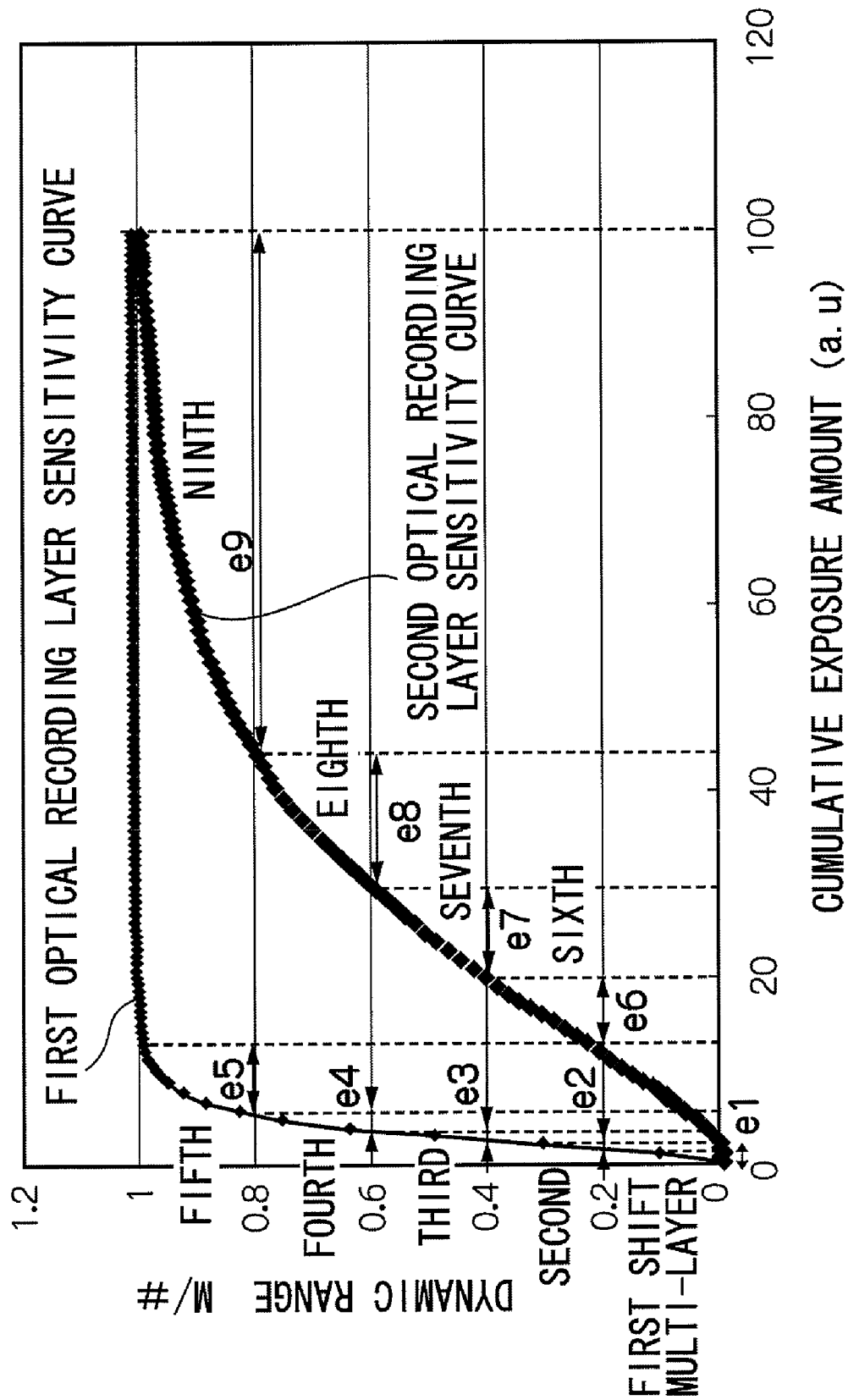

OPTICAL RECORDING DEVICE AND OPTICAL RECORDING METHOD

CROSS-REFERENCE TO RELATED APPLICATION

This application is based on and claims priority under 35 USC 119 from Japanese Patent Application No. 2007-334905 filed Dec. 26, 2007.

BACKGROUND

1. Technical Field

The present invention relates to an optical recording device and to an optical recording method.

2. Related Art

Coaxial recording methods (collinear methods) have recently been proposed as holographic memory recording and reproduction methods. Collinear methods have advantages, in comparison to conventional twin beam interference methods, such as dramatically simplifying the optical system used, being robust to external disturbances like vibrations, and servo mechanisms being readily introduced thereto. In collinear methods light of a signal beam and a reference beam having the same optical axis is converged by a common lens. However, the region in which a hologram is formed thereby is limited to a range within the very close vicinity of the focal plane, since interference is induce using the common lens. This means that the dynamic range (multiplicity) of a thick layer medium cannot be effectively utilized.

However, a conventional collinear method can only form a single three-dimensional hologram in the layer thickness direction of the medium. Therefore, it is necessary to make a small separation distance between adjacent holograms in the in-plane direction, in order to raise the recording density by shift multi-recording. This method tends to reduce the recording sensitivity as the multiplicity is increased, cross-talk is also increased between adjacent holograms and this inhibits increases in the capacity of optical recording media.

SUMMARY

According to an aspect of the invention, there is provided an optical recording device including a light source, a light-converging optical system, a moving unit, detection unit, and an acquisition unit. The light source generates a signal beam and a reference beam, radiating with the same optical axis from the same direction. The light-converging optical system converges recording light that includes the signal beam and the reference beam to at least one optical recording layer of a transmission optical recording medium. The moving unit moves a convergence position, where the recording light is converged by the light-converging optical system, relative to the transmission optical recording medium, such movement being relative movement in the in-plane direction of the transmission optical recording medium as well as relative movement in the optical axis direction. The detection unit detects the amount of movement from a convergence position reference position in the optical axis direction. The acquisition unit derives, for each of a plurality of the convergence positions in the optical axis direction, a cumulative exposure amount within the plane that includes the convergence position moved by the movement amount. The cumulative exposure amount is based on the recording sensitivity of the optical recording layer and on the movement amount of the convergence position detected by the detection unit. The acquisition unit apportions the cumulative exposure amount across all the pages of in-plane recording to acquire the light exposure amount for each page. In the optical recording device, interference fringes from the recording light are shift multi-recorded as a plurality of pages of holograms within each of a plurality of planes corresponding to the plurality of convergence positions based on the light exposure amount of each page, acquired by the acquisition unit, for each of the convergence positions.

BRIEF DESCRIPTION OF THE DRAWINGS

Exemplary embodiments of the present invention will be described in detail based on the following figures, wherein:

FIG. 16 is a graph for explaining setting the multi-recording exposure conditions are set in the second exemplary embodiment of the present invention;

DETAILED DESCRIPTION

Explanation will now be given of details of one exemplary embodiment of the present invention, with reference to the drawings.

Hologram Recording/Reproduction Device

Figure 1:
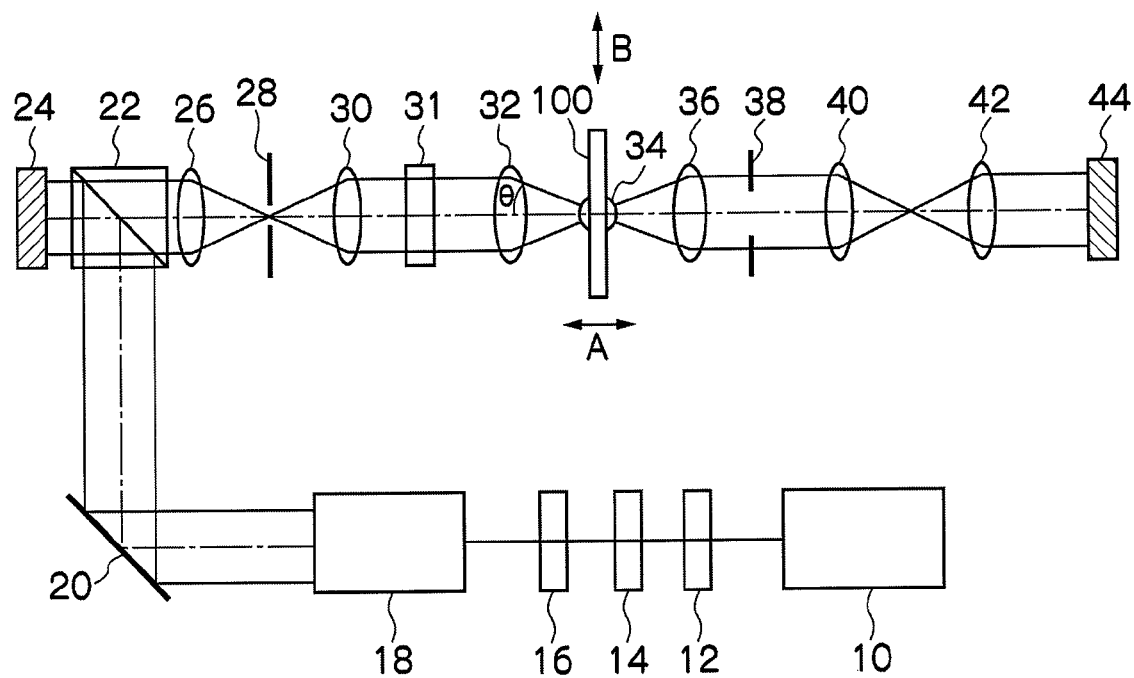
FIG. 1 is a schematic diagram showing a configuration of a hologram recording/reproduction device according to an exemplary embodiment of the present invention.

FIG. 1 is a schematic diagram showing a configuration of a hologram recording/reproduction device according to an exemplary embodiment of the present invention. Explanation will now be given of the recording/reproduction device in the present exemplary embodiment that uses a reflection-spatial light modulator (SLM) and a transmission optical recording medium. The hologram recording/reproduction device is a collinear hologram recording/reproduction device that radiates a signal beam and a reference beam with a common optical axis onto an optical recording medium as a single beam of recording light from the same direction.

There is a light source 10 provided in the hologram recording/reproduction device for oscillating a laser beam of coherent light. A laser light source oscillating a green laser beam of oscillating wave length 532 nm may be used, for example, as the light source 10. The following are provided in the following sequence along the optical path on the light emitting side of the light source 10: a shutter 12 which can be introduced into, or removed from (opening and closing) the optical path; a ½ wave length plate 14 that imparts an optical path difference of ½ a wave length between orthogonal components of linearly polarized light; a polarizing plate 16 that allows light polarized in a specific direction to pass through; a beam expander 18, which is a expanding/collimating optical system; and a reflection mirror 20. The shutter 12 is driven to open and close by a drive device (not illustrated) connected to a control device (not illustrated), such as a PC.

A polarized beam splitter 22 is disposed on the light-reflecting side of the reflection mirror 20, and the polarized beam splitter 22 reflects light polarized in a specific direction, while letting light polarized in a direction orthogonal thereto pass through. A SLM 24 is disposed on the light-reflecting side of the polarized beam splitter 22, the SLM 24 being a reflection SLM, such as a liquid crystal device (LCD), polarize-modulating incident light for each pixel. Put another way, the polarized beam splitter 22 is disposed on the light-reflecting side of the SLM 24. The SLM 24 is connected through a pattern generating device (not illustrated) to the control device (not illustrated). The pattern generating device generates a pattern for display on the SLM 24 according to digital data supplied from the control device (not illustrated). The SLM 24 modulates an input laser beam according to the displayed pattern.

A pair of relay lenses 26, 30 and a Fourier transform lens 32 are disposed in this sequence along the optical path on the light transmission side of the polarized beam splitter 22. The Fourier transform lens 32 irradiates recording light onto a hologram recording medium 100. The focal point position of the Fourier transform lens 32 is the convergence point of the converging recording light. A light-blocking plate 28, provided with an aperture, is disposed between the relay lens 26 and the relay lens 30, in the vicinity of the beam waist. A phase mask 31 is disposed between the relay lens 30 and the Fourier transform lens 32, in the vicinity of the imaging plane of the relay lens 30. The phase mask 31 applies a random phase. It should be noted that the light-blocking plate 28 and the phase mask 31 are not essential components, and may be omitted as appropriate.

A moving mechanism 34 is provided on the light emitting side of the Fourier transform lens 32. The moving mechanism 34 serves as a moving unit that holds and moves the hologram recording medium 100, which is an optical recording medium. The moving mechanism 34 is provided with a holding stage (not illustrated) for holding the hologram recording medium 100, a drive unit (not illustrated) for driving the holding stage, and a detection unit (not illustrated) for detecting the amount of movement of the holding stage from a reference position in units of µm. Namely, the moving mechanism 34 also exhibits the functionality of a detection unit for detecting the amount of movement thereof It should be noted that a non-illustrated control device functions as an acquisition unit.

The holding stage, for example, holds the hologram recording medium 100 so that the central position in the width direction of the hologram recording medium 100 is positioned at the reference position of the focal point position of the Fourier transform lens 32. The holding stage holding the hologram recording medium 100 is moved by the drive unit in the optical axis direction (direction of arrow A) and the in-plane direction of the optical recording medium (direction of arrow B). In the present invention, the focal point position of the recording light is shifted in the optical axis direction relative to the hologram recording medium 100, and data is recorded on plural optical axis direction layers of a later described optical recording layer. Which one of the layers the focal point position of the recording light is convergent at is known from the amount of movement detected by the detection unit. The focal point position at which the recording light is converged can therefore be adjusted from the detected amount of movement.

There is a Fourier transformation lens 36, a pair of relay lenses 40, 42, and a sensor array 44 disposed on the light transmission side of the hologram recording medium 100. The sensor array 44 is configured by an image capture element, such as a CCD or a CMOS array, and the sensor array 44 converts reproduction light (diffraction light) which is received thereby into an electrical signal that is output. There is a light-blocking plate 38 disposed between the relay lens 40 and the relay lens 42, the light-blocking plate 38 having a large diameter aperture. It should be noted that the light-blocking plate 38 is not an essential component and may be omitted as appropriate. The sensor array 44 is connected to the control device (not illustrated). The sensor array 44 reads out data encoded on the signal beam, and outputs the data to the control device (not illustrated).

Recording and Reproduction Operations

Explanation will now be given of the operations of recording/reproduction of the hologram recording/reproduction device shown in FIG. 1.

When recording a hologram, the shutter 12 is opened, and a laser beam is radiated from the light source 10. At the same time, digital data is output from the control device with a specific timing, and a specific pattern is displayed on the SLM 24. The oscillated laser beam from the light source 10 passes through the shutter 12, and the light intensity and polarization direction is adjusted by the ½ wave length plate 14 and the polarizing plate 16. For example, the polarizing plate 16 is disposed so that only S-polarized light passes therethrough and the light intensity of the S-polarized light is adjusted by controlling the polarization direction of the laser beam using the ½ wave length plate 14. Light that passes through the polarizing plate 16 is converted into a large diameter parallel beam by the beam expander 18 and irradiated onto the reflection mirror 20.

Light reflected from the reflection mirror 20 is introduced into the polarized beam splitter 22. The polarized beam splitter 22 reflects S-polarized light and allows P-polarized light to pass therethrough. The irradiated light (S-polarized light) is reflected at the polarized beam splitter 22 in the direction of the SLM 24. A specific pattern is displayed on the SLM 24. The laser beam is polarization-modulated (from S-polarized light to P-polarized light) at the SLM 24, and a signal beam and a reference beam are generated.

Figure 2:
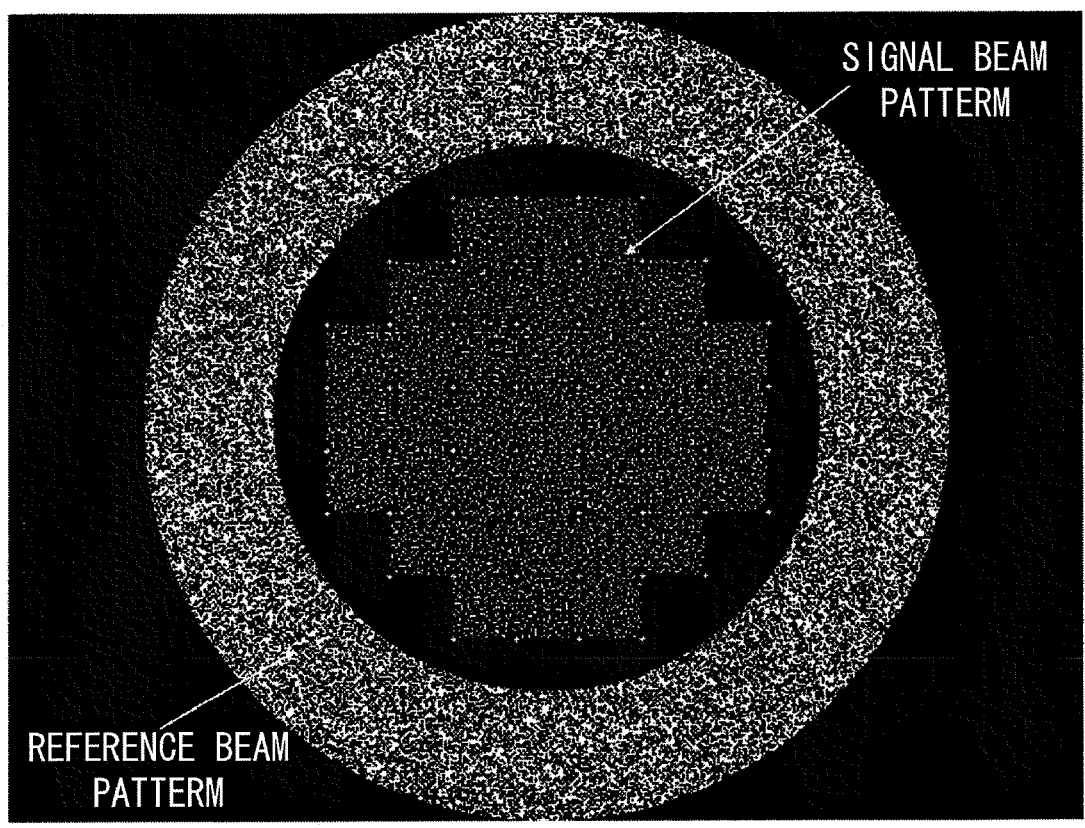
FIG. 2 is a diagram showing a pattern of a signal beam and a reference beam displayed on a spatial optical modulator.

For example, as shown in FIG. 2, a central portion of the SLM 24 is used for data display while a peripheral portion of the SLM 24 is used for the reference beam. Namely, the central portion of the SLM 24 is used as a signal beam region, and the peripheral portion surrounding the signal beam region is used as a reference beam region.

The laser beam introduced to the central portion of the SLM 24 is polarization-modulated according to the displayed pattern, and the signal beam is generated. The display pattern for the signal beam is binary digital data (0, 1) representing "dark (black pixels) and light (white pixels)". The laser beam introduced into the peripheral portion of the SLM 24 is polarization-modulated according to the displayed pattern, and the reference beam is generated. The display pattern used for the reference beam is, for example, a random pattern.

The recording light polarization-modulated at the SLM 24 is irradiated onto the polarized beam splitter 22, passes through the polarized beam splitter 22 and converted into an amplitude distribution of the linearly polarized light (P-polarized light). The recording light is then made to converge at the relay lens 26, and irradiated onto the aperture provided light-blocking plate 28. Unwanted frequency components of the recording light converging at the relay lens 26 are cut-out at the light-blocking plate 28, and the remaining portions of the recording light pass through the aperture. The recording light that has passed through the aperture is converted into a parallel beam by the relay lens 30, passes through the phase mask 31 and is phase-modulated. The superimposition of the signal beam and the reference beam is improved by such phase-modulation, and also, since the light intensity distribution of the recording light is made uniform, the dynamic range of the optical recording medium can be used effectively.

The recording light that has passed through the phase mask 31, namely the signal beam and the reference beam, are Fourier transformed and made to converge by the Fourier transform lens 32, and irradiated at the same time and coaxially onto the hologram recording medium 100 held in the moving mechanism 34. An interference fringe is formed by interference between the signal beam and the reference beam at the position where the signal beam and the reference beam converge, and the interference fringe is recorded at the later described optical recording layer of the hologram recording medium 100. It should be noted that a large numerical aperture (NA) is used as the Fourier transform lens 32, as will be explained later in more detail.

When reading out (reproducing) data recorded on the hologram recording medium 100, the shutter 12 is opened, and a laser beam is radiated from the light source 10. At the same time, digital data is output from the control device with a specific timing, and a specific pattern is displayed on the SLM 24 such that only the reference beam is irradiated onto the hologram recording medium 100. The oscillated laser beam from the light source 10 is introduced to the SLM 24 in the same manner as when recording. The laser beam introduced to the SLM 24 is polarization-modulated according to the displayed pattern, and the reference beam is generated. The generated reference beam is, in a similar manner to when recording, irradiated onto the region where a hologram has been recorded on the hologram recording medium 100. Namely, only the reference beam is irradiated onto the hologram recording medium 100 as read-out light.

The irradiated reference beam is diffracted by the hologram as it passes through the hologram recording medium 100, and light diffracted and transmitted by the hologram (reproduction light) is emitted to the Fourier transformation lens 36 side of the hologram recording medium 100. A portion of the reference beam passes through the hologram recording medium 100 without being diffracted. The emitted reproduction light is inverse Fourier transformed by the Fourier transformation lens 36, and irradiated onto the aperture provided light-blocking plate 38. The reproduction light that has been inverse Fourier transformed by the Fourier transformation lens 36 has the transmitted reference beam cut therefrom at the light-blocking plate 38, and the remaining portion thereof passes through the aperture. The light that has passed through the aperture is relayed and converted into a parallel beam by the pair of relay lenses 40, 42, and then introduced into the sensor array 44.

The sensor array 44 converts the received reproduction light (diffracted light) into an electrical signal and outputs the electrical signal. Namely, the sensor array 44 reads out the data encoded on the signal beam and outputs this data to the control device (not illustrated). It should be noted that preferably light from one pixel of signal beam data is received at the sensor array 44 by plural light receiving elements, with over sampling being carried out. In the present exemplary embodiment a single bit of data is received as light by 4 (2×2) individual light receiving elements.

Hologram Recording Medium

Figure 3:
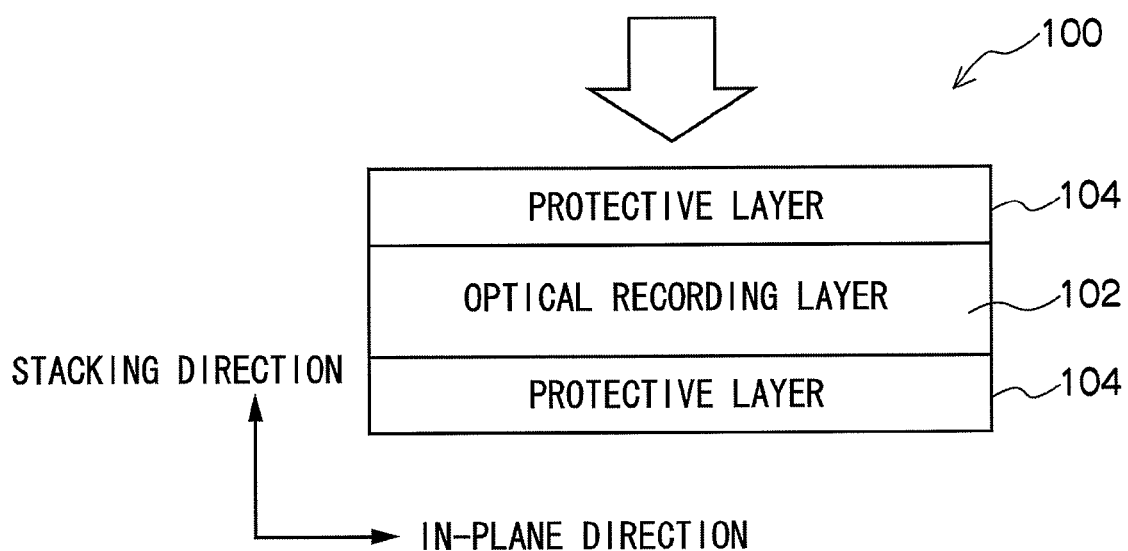
FIG. 3 is a cross-section showing an example of a configuration of a hologram recording medium.

FIG. 3 is a cross-section showing an example configuration of the hologram recording medium 100. The hologram recording medium 100 is configured with an optical recording layer 102, and a pair of protective layers 104 sandwiching the optical recording layer 102. Put in another way, the optical recording layer 102 is stacked on top of one of the protective layer 104, and the other protective layer 104 is stacked on top of the optical recording layer 102. Recording light is introduced in the direction of the arrow (from the top side in the stacking direction). The hologram recording medium 100 is formed in a flat plate shape, such as a disk or a sheet. It should be noted that the direction orthogonal to the surface of the hologram recording medium 100 is referred to below, according to the contents of the explanation, as the stacking direction, the optical axis direction or the layer thickness direction, and directions parallel to the surface of the hologram recording medium 100 is referred to as in-plane directions.

The optical recording layer 102 is configured from a recording material that is capable of recording the light and dark of an interference fringe from two beams as a refractive index distribution (hologram). A photopolymer is preferably used as the recording material. The protective layer 104 is a layer that protects the optical recording layer 102, and is configured from a glass plate, resin substrate or the like, that is transparent to the recording light.

In the present invention, the position of convergence of the recording light is shifted in the optical axis direction with respect to the hologram recording medium 100, and data is recorded in plural layers in the optical axis direction of the hologram recording medium 100. A transmitting hologram recording medium that transmits light is therefore used as the hologram recording medium 100, rather than a reflecting recording medium. In a reflecting recording medium, a focal point is always made to be on the reflecting plane, thereby a device configured to focus an image on a fixed two dimensional sensor array (light receiving element) is available. If the focal point position of the signal beam is changed with respect to a reflecting recording medium, there are accompanying changes to the position of image focus and size of a reproduced image. Therefore, when using a reflecting recording medium, it becomes difficult to reproduce recorded data if the data has been recorded by shifting both the signal beam and reference beam in the optical axis direction. In addition, even if data reproduction were to be realized, an extremely complicated reproduction optical system would be required.

Hologram Size Estimation

Figure 4:
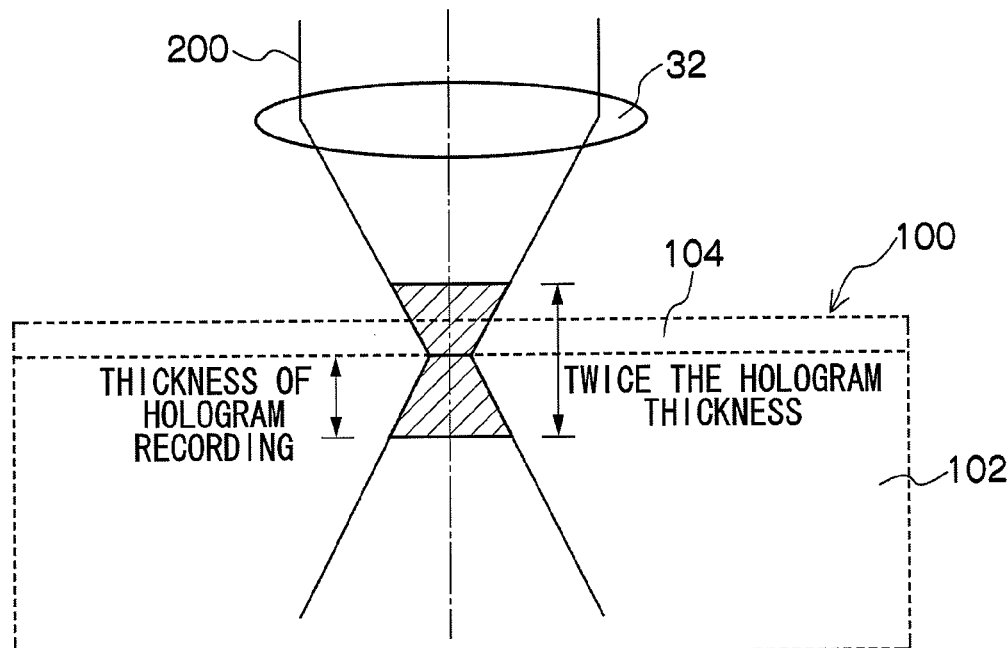
FIG. 4 is a schematic diagram showing the size of hologram recording on a hologram recording medium.

FIG. 4 is a schematic diagram showing the size of hologram recording on the optical recording layer 102 of the hologram recording medium 100. The device shown in FIG. 1 is used in this example, and recording light 200 is made to converge by the Fourier transform lens 32 such that the focal point position thereof is in the vicinity of the boundary plane between the optical recording layer 102 and the protective layer 104 of the hologram recording medium 100. A hologram is recorded in the region of the optical recording layer 102 which has been exposed by the recording light 200, a portion of the part indicated with diagonal shading (the trapezoidal shaped portion at the lower side in the drawing). In this case the thickness of the hologram recording is approximately equivalent to the height of the lower side trapezoidal shaped portion. However, when the focal point position is made to be within the optical recording layer 102, a hologram is recorded in all of the part indicated with diagonal shading (the upper and lower trapezoidal shaped portions in the drawing). The thickness of the hologram recording is doubled in such a case, and the height of one of the trapezoidal shaped portions is taken as the "hologram thickness (hologram size)".

Figure 5:
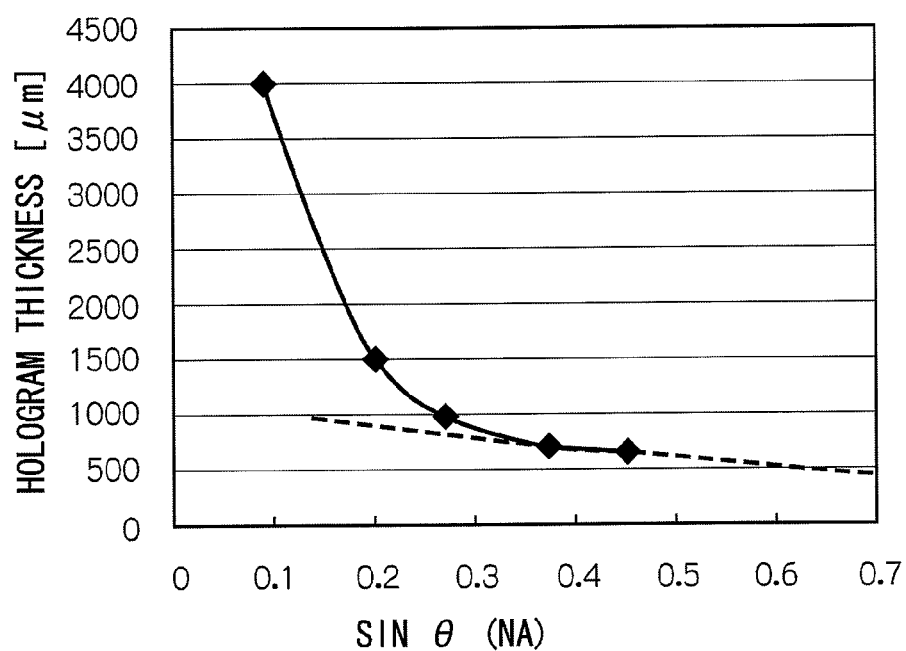
FIG. 5 is a graph showing the relationship between an experimentally estimated numerical aperture (NA) of a Fourier transfer lens and the hologram size.

FIG. 5 is a graph showing the relationship between an experimentally estimated numerical aperture (NA) of a Fourier transfer lens and the hologram size. The horizontal axis shows the NA ($\approx \sin \theta$) and the vertical axis shows the hologram thickness (units: μm). $\theta$ is the angle formed at the focal point position between rays of light passing through the furthest point to the outside of the lens and rays of light passing through the center thereof (along the optical axis) (see FIG. 1). In this example, in a similar manner to in FIG. 4, the recording light 200 is made to converge by the Fourier transform lens 32 such that the focal point position is in the vicinity of the boundary between the optical recording layer 102 and the protective layer 104 of the hologram recording medium 100. The hologram size is evaluated from the defocus dependence of the hologram recording for each of the effective NAs between 0.1 and 0.45. The effective NA is taken as a value of $\sin \theta$ derived by changing the value of $\theta$ by changing the size of the displayed pattern of the signal beam and the reference beam as shown in FIG. 2. The hologram size is estimated by measuring how far the focal point position may be shifted away from the surface of the optical recording layer 102 until it becomes impossible to record a hologram.

It can be seen from these results that as the NA gets larger, the hologram size gets smaller. In particular, as the NA exceeds 0.2 the hologram size rapidly gets smaller. The hologram size is estimated at 670 μm in a hologram recording/reproduction device (similar to the configuration shown in FIG. 1) using a Fourier transformation lens with a NA=0.45. When the curve obtained from the evaluation results is extrapolated, as shown by the intermittent line, it can be estimated that hologram size is 500 μm when a Fourier transformation lens of NA=0.65 is used.

Optimization of the Inter-Layer Distance

Figure 6:
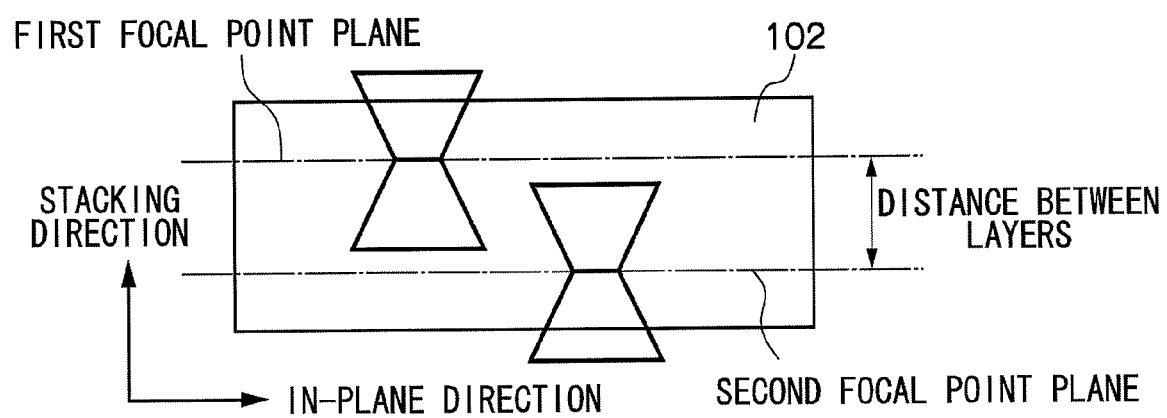
FIG. 6 is a diagram defining the interlayer distance in two focal point recording.
Figure 7:
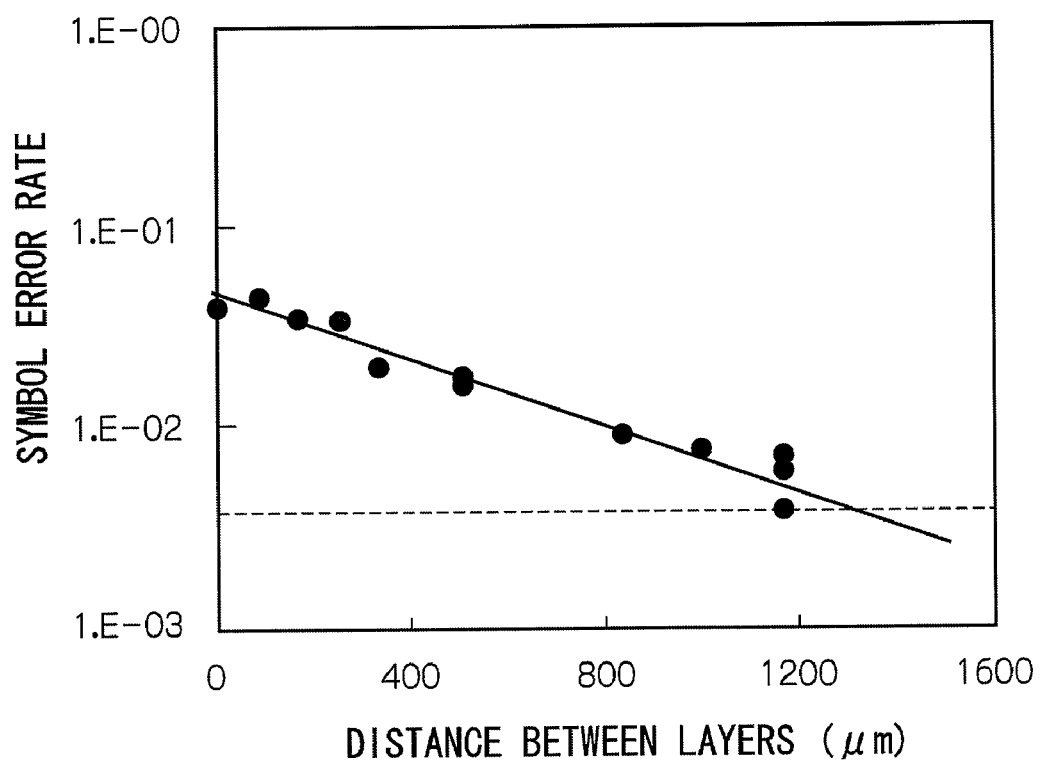
FIG. 7 is a graph showing the results of measurement of the dependency on inter-layer distance for multi-recording in two focal point recording.

FIG. 6 is a diagram defining the interlayer distance in two focal point recording. In this example, two layers of hologram recording is carried out to the optical recording layer 102 of the hologram recording medium 100. The distance in the stacking direction between the focal point position of one of the layers (first focal point plane) and the focal point position of the other of the layers (second focal point plane) is the "inter-layer distance". FIG. 7 is a graph showing the results of measurement of the dependence on inter-layer distance for multi-recording in two focal point recording. The horizontal axis shows the inter-layer distance (units: μm) and the vertical axis shows the symbol error rate. The symbol error rate is the error rate of data pattern units representing a 5-bit data row. It should be noted that the symbol error rate is shown as an exponential. For example, "1.E-02" means $1 \times 10^{-2}$. The graph shows measurement results of two-layer multi-recording of 102 holograms with a shift amount for 8 μm per layer.

Figure 8:
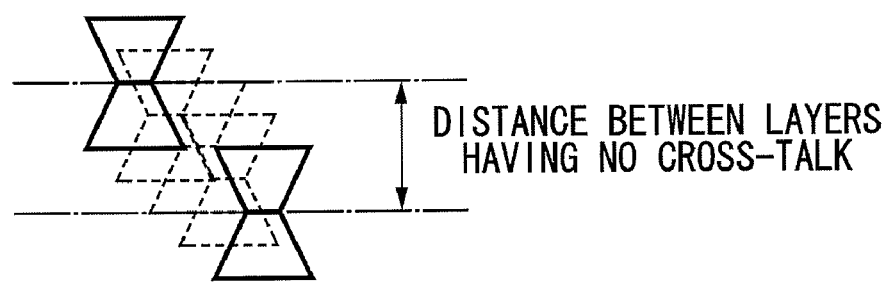
FIG. 8 is a diagram showing an interlayer distance at which there is no cross-talk generated between two layers.

The solid line shows the straight line derived using a least squares method based on the plotted position. The intermittent line shows a straight line of the limits of the symbol error rate when 52 holograms are recorded in a single layer using a shift amount of 16 μm. It can be seen from the intersection between these two straight lines that when the hologram thickness (hologram size) is 670 μm, that hologram recording with an error rate substantially the same as that of single layer recording can be realized by setting the inter-layer distance of the two focal points at 1340 μm, twice the hologram size. Namely, it is preferable in multi-recording of two holograms stacked in the optical axis direction to set the distance between the focal point positions thereof in the optical axis direction to be twice that of the hologram size, as shown in FIG. 8, since cross-talk is not generated between the two layers. This multi-recording method is referred to below as "stacked-layer multi-recording".

Hologram Recording Medium Applicable to Stacked-Layer Multi-Recording

Figure 9A:
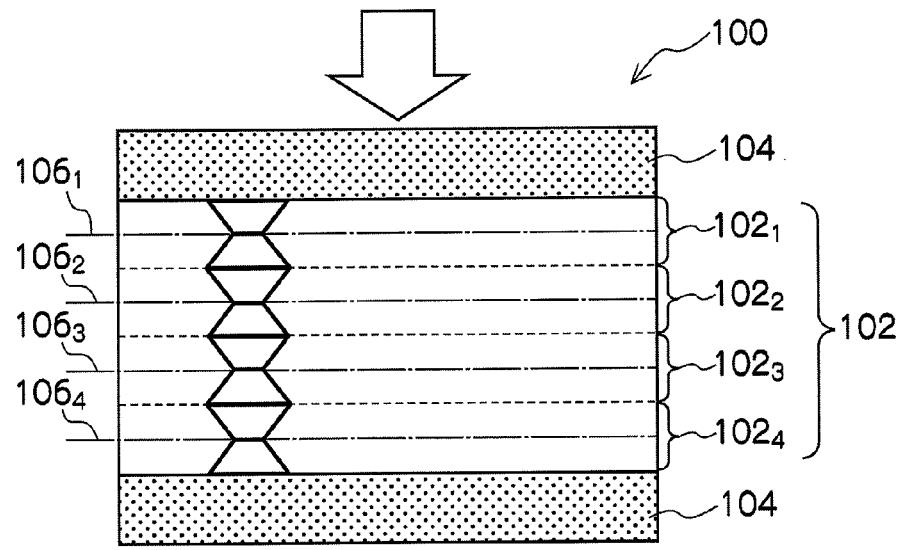
FIG. 9A to 9C are partial cross-sections showing examples of hologram recording medium layer configurations applied in stacked-layer multi-recording.
Figure 9B:
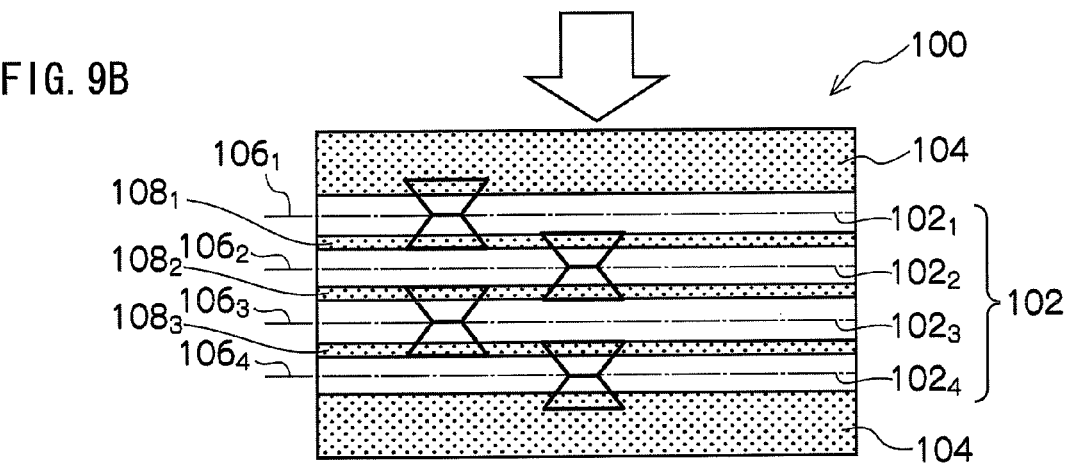
Figure 9C:
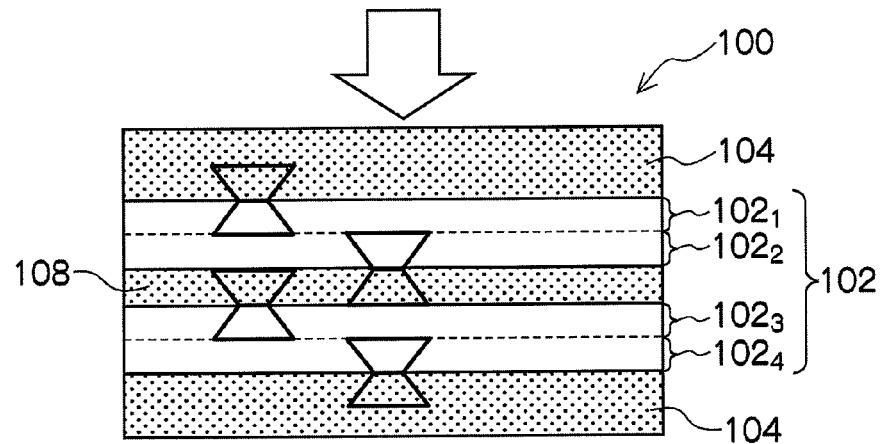

FIG. 9A to 9C are partial cross-sections showing examples of layer configurations of the hologram recording medium 100 suitable for stacked-layer multi-recording. These are preferable four-layer embodiments for realizing stacked-layer multi-recording. When the recording capacity of each layer is 300 GB, then 1 terabyte (TB) recording capacity or greater is realizable on a single sheet of hologram recording medium.

The hologram recording medium 100 shown in FIG. 9A is configured with a single optical recording layer 102, with the optical recording layer 102 sandwiched between a pair of protective layers 104. There are four focal point positions $106_1$ to $106_4$ in the optical recording layer 102, and since they are separated from each other in the optical axis direction by a distance of twice the hologram size there is no cross-talk therebetween, and multi-recording can be carried out with four holograms stacked in the optical axis direction. The layer for recording a hologram by making recording light converge at the focal point position $106_1$ is a shift multi-layer $102_1$, the layer for recording a hologram by making recording light converge at the focal point position $106_2$ is a shift multi-layer $102_2$, the layer for recording a hologram by making recording light converge at the focal point position $106_3$ is a shift multi-layer $102_3$, and the layer for recording a hologram by making recording light converge at the focal point position $106_4$ is a shift multi-layer $102_4$.

The hologram recording medium 100 shown in FIG. 9B is configured with four optical recording layers 102, with the optical recording layers 102 sandwiched between a pair of protective layers 104. The layer for recording a hologram by making recording light converge at a focal point position $106_1$ is a shift multi-layer $102_1$, the layer for recording a hologram by making recording light converge at a focal point position $106_2$ is a shift multi-layer $102_2$, the layer for recording a hologram by making recording light converge at a focal point position $106_3$ is a shift multi-layer $102_3$, and the layer for recording a hologram by making recording light converge at a focal point position $106_4$ is a shift multi-layer $102_4$.

There is a gap layer $108_1$ disposed between the shift multi-layer $102_1$ and the shift multi-layer $102_2$, there is a gap layer $108_2$ disposed between the shift multi-layer $102_2$ and the shift multi-layer $102_3$, and there is a gap layer $108_3$ disposed between the shift multi-layer $102_3$ and shift multi-layer $102_4$. The thicknesses of the shift multi-layers $102_1$ to $102_4$ are each the same, and the thicknesses of the gap layers $108_1$ to $108_3$ are each the same.

In this case, by making ½ of the thickness of the shift multi-layer and the thickness of the gap layer total to greater than the potential hologram size defined in FIG. 4 there is no cross-talk, and multi-recording can be carried out of four holograms stacked in the optical axis direction. In addition, by providing the gap layers 108, there is the advantage that the separation for disposing the four focal point positions $106_1$ to $106_4$ becomes narrower, and the overall layer thickness of the hologram recording medium 100 is smaller in comparison with the case of FIG. 9A.

The hologram recording medium 100 shown in FIG. 9C is configured with two optical recording layers 102, with the optical recording layers 102 sandwiched between a pair of protective layers 104. There is a gap layer 108 disposed between the two optical recording layers 102. The layer for hologram recording by making recording light converge at the boundary of the upper optical recording layer 102 and one of the protective layers 104, disposed at the recording light incident side, is a shift multi-layer $102_1$, and the layer for hologram recording by making recording light converge at the boundary of this optical recording layer 102 and the gap layer 108 is a shift multi-layer $102_2$.

In the same manner, the layer for hologram recording by making recording light converge at the boundary of the gap layer 108 and the lower optical recording layer 102 is a shift multi-layer $102_3$ and the layer for hologram recording by making recording light converge at the boundary of this optical recording layer 102 and the other one of the protective layers 104, is a shift multi-layer $102_4$. The thicknesses of the shift multi-recording layers $102_1$ to $102_4$ are each the same.

In this case, by making the hologram thickness (hologram size) equivalent to that of the gap layer 108, there is no cross-talk and multi-recording can be made of four holograms stacked in the optical axis direction. In addition, fixing the focal point positions on the boundary planes in this configuration is useful for the introduction of a servo mechanism. There is also the further advantage of making the overall layer thickness of the hologram recording medium 100 smaller by introducing the gap layer 108.

First Exemplary Embodiment

Explanation will now be given of a schedule-recording method used when multi-recording with plural layers of stacked holograms in a single optical recording layer configured from a single material, with reference to FIGS. 10 to 13. $M_v$ represents the degree of multiplicity in the stacking direction (degree of stacking multiplicity), and the degree of stacking multiplicity $M_v$ is 5 in the present exemplary embodiment. It should be noted that the schedule recording is a recording method for performing multi-recording while changing the exposure conditions, in order to even out the diffraction efficiency of multi-recording holograms. Multi-recording to the hologram recording medium 100 is carried out using the hologram recording/reproduction device shown in FIG. 1.

Figure 10:
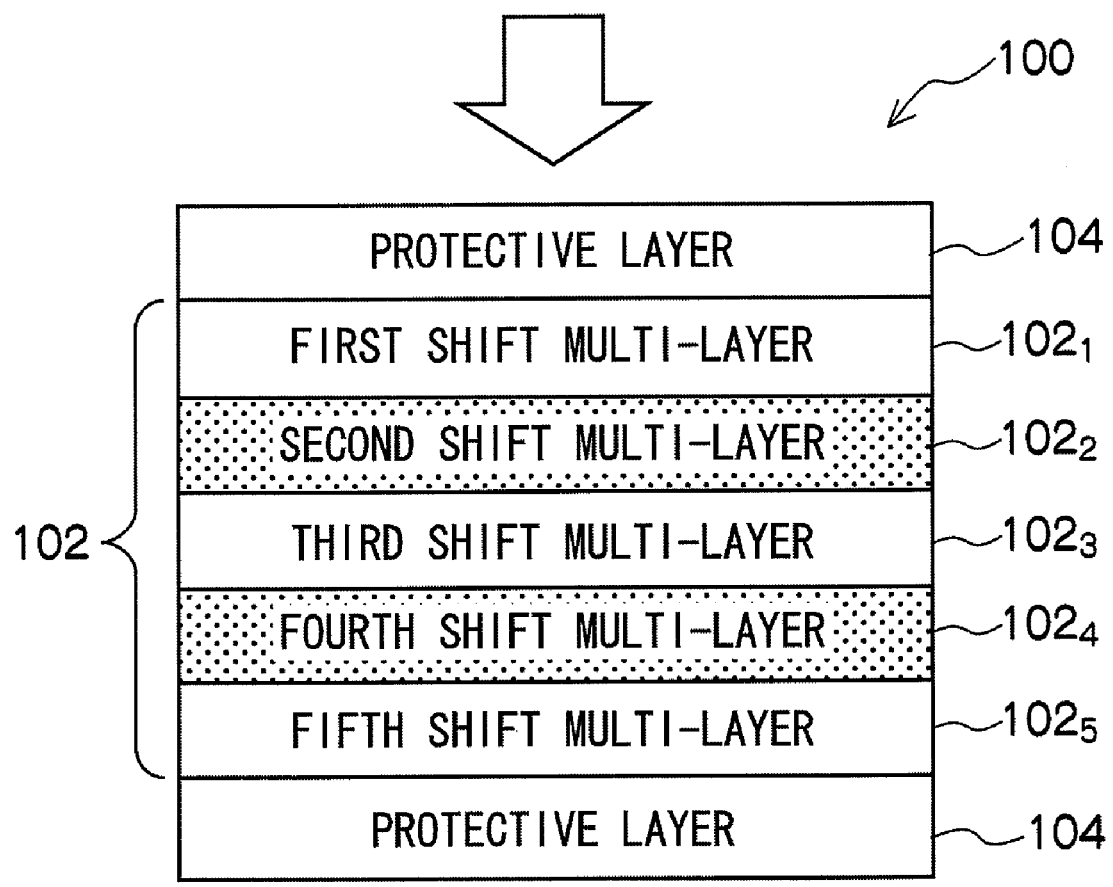
FIG. 10 is a partial cross-section showing a hologram recording medium layer configuration used in a first exemplary embodiment.

FIG. 10 is a partial cross-section showing a layer configuration of a hologram recording medium 100 used in a first exemplary embodiment. The hologram recording medium 100 has the optical recording layer 102 configured from a single material having a specific recording sensitivity S, with a pair of protective layers 104 sandwiching the optical recording layer 102. There are five focal point positions $106_1$ to $106_5$ in the optical recording layer 102, as shown in FIG. 11, separated from each other by a distance of twice the hologram size, and accordingly multi-recording with five holograms stacked in the optical axis direction can be carried out without cross-talk.

The layer for recording a hologram by making recording light converge at the focal point position $106_1$ is a first shift multi-layer $102_1$, the layer for recording a hologram by making recording light converge at the focal point position $106_2$ is a second shift multi-layer $102_2$, the layer for recording a hologram by making recording light converge at the focal point position $106_3$ is a third shift multi-layer $102_3$, the layer for recording a hologram by making recording light converge at the focal point position $106_4$ is a fourth shift multi-layer $102_4$, and the layer for recording a hologram by making recording light converge at the focal point position $106_5$ is a fifth shift multi-layer $102_5$.

Figure 11:
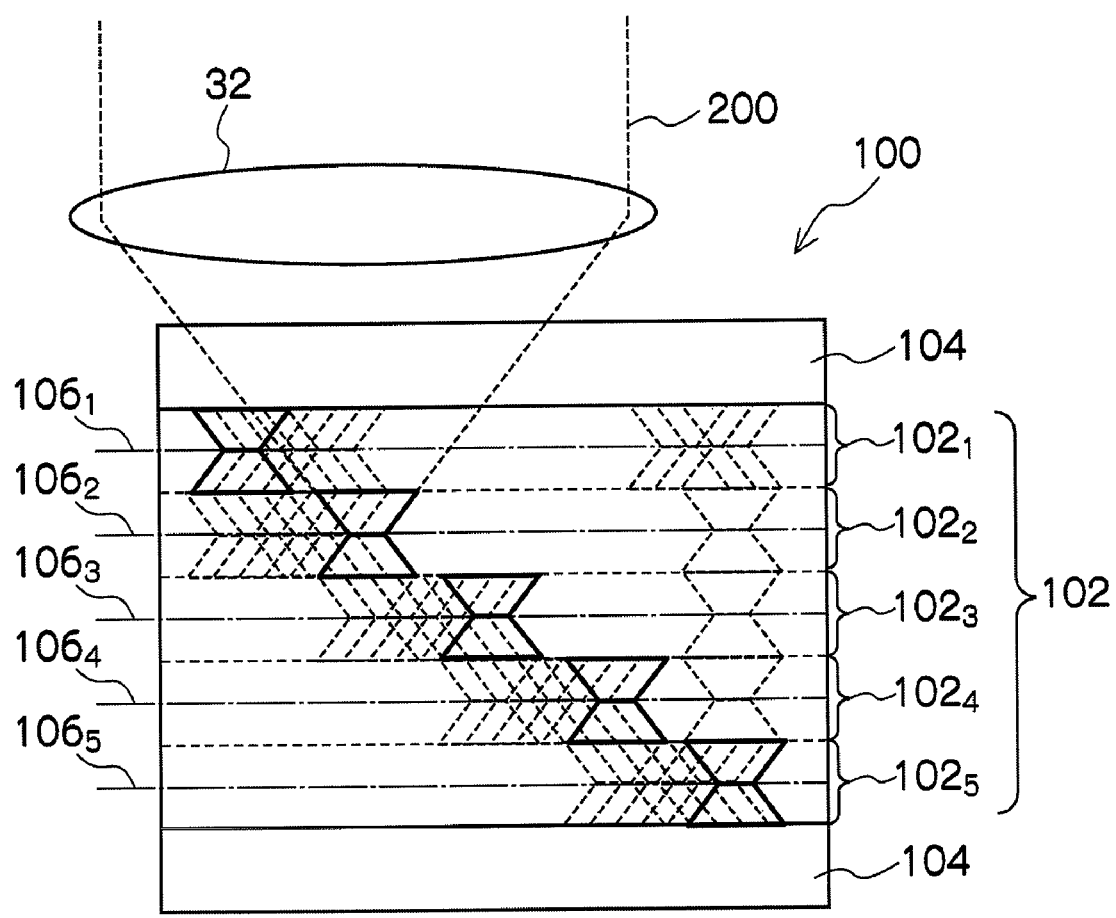
FIG. 11 is an explanatory diagram of a schedule-recording method of a first exemplary embodiment of the present invention.

In the first exemplary embodiment, as shown in FIG. 11, holograms are recorded by making the recording light 200 converge at one or other of the focal point positions $106_1$ to $106_5$ using the Fourier transform lens 32. The shift multi-recording is carried out in each of the first shift multi-layer $102_1$ to the fifth shift multi-layer $102_5$ with, for example, the same exposure conditions (the exposure intensity and exposure duration is the same for each hologram). Shift multi-recording can thereby be performed within the same shift multi-layer using the desired design exposure conditions. No complicated control is required when shift multi-recording is performed with the same exposure conditions. In contrast, stacked-layer multi-recording is performed with different exposure conditions between each of the first shift multi-layer $102_1$ to the fifth shift multi-layer $102_5$ (with different cumulative exposure amounts for each of the shift multi-layers). In this manner, shift multi-recording can be carried out with different exposure conditions for each of the different shift multi-layers. The dynamic range is effectively utilized by performing stacked-layer multi-recording with different exposure conditions. It should be noted that any two or more of the shift multi-layers may have the same exposure conditions, depending on the sensitivity characteristics of the recording material.

Each of the layers, of the first shift multi-layer $102_1$ to the fifth shift multi-layer $102_5$, is exposed in sequence from the light-incident side of the recording layer. Namely, exposure is carried out in the sequence of the first shift multi-layer $102_1$, the second shift multi-layer $102_2$, the third shift multi-layer $102_3$, the fourth shift multi-layer $102_4$, and the fifth shift multi-layer $102_5$. When the shift multi-layers are recorded in the above sequence, for example, the first shift multi-layer $102_1$ to the fourth shift multi-layer $102_4$ are already recorded when the hologram shown at the bottom right of FIG. 11 is being recorded to the fifth shift multi-layer $102_5$. Even if the recording light is affected by the previously recorded holograms, the hologram recorded in the fifth shift multi-layer $102_5$ can be read-out by using the same reference beam as was used during recording. The layers that have already been exposed are also faded, and so less exposure energy is required for recording the fifth shift multi-layer $102_5$ than would have been the case if the other layers had not been previously recorded.

Figure 12:
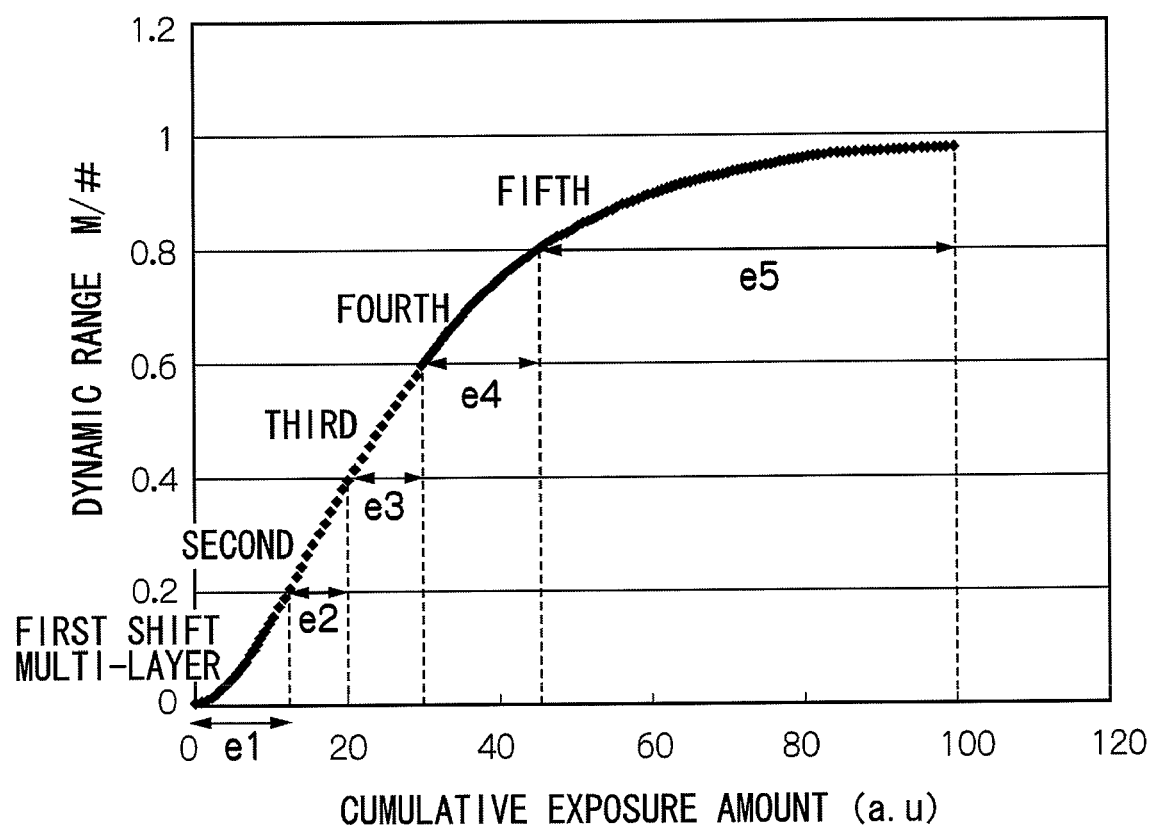
FIG. 12 is a graph for explaining setting the multi-recording exposure conditions in the first exemplary embodiment of the present invention.

FIG. 12 is a graph for explaining setting the multi-recording exposure conditions. The optical recording layer 102, i.e. each layer of the first shift multi-layer $102_1$ to the fifth shift multi-layer $102_5$, is configured from a single recording material having a specific recording sensitivity S, as stated above. The recording sensitivity S, as shown in FIG. 12, is the sensitivity curve, with the cumulative exposure amount on the horizontal axis and the M/# (M number) on the vertical axis. The "M/#" is an amount indicating the dynamic range when recording with multiplicity M, and the diffraction efficiency of the $i^{th}$ multi-recording is represented by "$\eta_i$" in the following Equation 1. The example illustrated is when "M/#"=1. The units of the cumulative exposure amount "a.u." are arbitrary units so as to be 100 when "M/#"=1.

$$M/\# = \sum_i \sqrt{\eta_i} \qquad \text{Equation 1}$$

The degree of stacking multiplicity $M_v$ is 5 in the first exemplary embodiment. When the dynamic range is divided into 5 equal portions, in order to fully utilize the dynamic range with exposure 5 times in the stacking direction, the cumulative exposure amounts $e_1$ to $e_5$ for each layer of the first shift multi-layer $102_1$ to the fifth shift multi-layer $102_5$ are derived according to the recording sensitivity S. Shift multi-recording is accordingly performed with different exposure conditions between the shift multi-recording layers according to the recording sensitivity. The degree of multiplicity in the in-plane direction (in-plane degree of multiplicity) is represented by $M_h$, and the exposure amount for each hologram in the page of the first shift multi-layer $102_1$ is $e_1/M_h$. In the same manner, the exposure amount for each hologram in each of the pages of the second shift multi-layer $102_2$ to the fifth shift multi-layer $102_5$ are respectively $e_2/M_h$ to $e_5/M_h$. By so doing, shift multi-recording is performed with the same exposure conditions within the same shift multi-layer. It should be noted that each holograms within the same shift multi-layer may be allotted different exposure amounts.

Figure 13A:
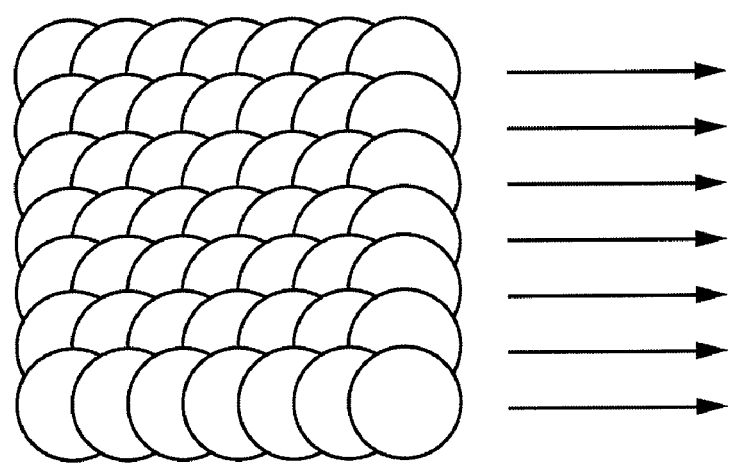
FIGS. 13A and 13B are diagrams showing multi-recording methods of shifts in the in-plane direction.
Figure 13B:
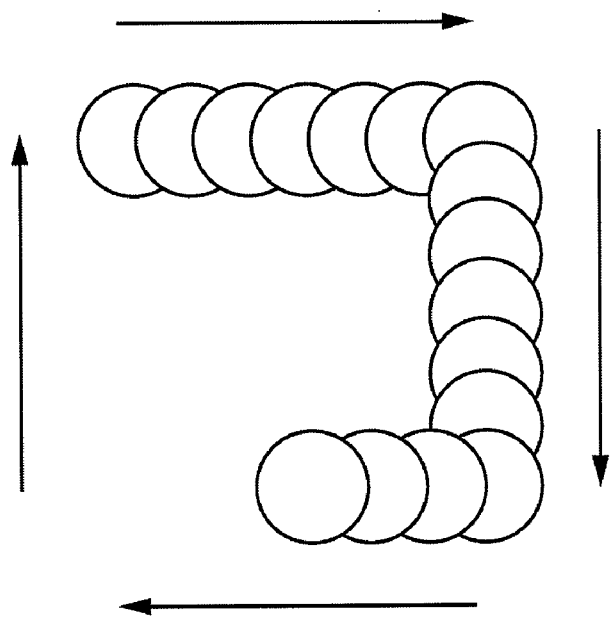

A standard shift multi-recording method may be used within the planes. For example, when recording 49 individual holograms in 7 columns and 7 rows, as shown in FIG. 13A, a shift multi-recording method may be employed in which 7 individual holograms are recorded across, and then 7 individual holograms are recorded again after shifting by one row in the vertical direction, or a shift multi-recording may be carried out while shifting in a spiral pattern, as shown in FIG. 13B.

Second Exemplary Embodiment

Explanation will now be given of a schedule-recording method when multi-recording holograms stacked in plural layers in two layers of optical recording layers configured from different materials, with reference to FIGS. 14 to 16. In the second exemplary embodiment the degree of stacking layer multiplicity $M_v$ is 9. Multi-recording to the hologram recording medium 100 is performed using the hologram recording/reproduction device shown in FIG. 1.

Figure 14:
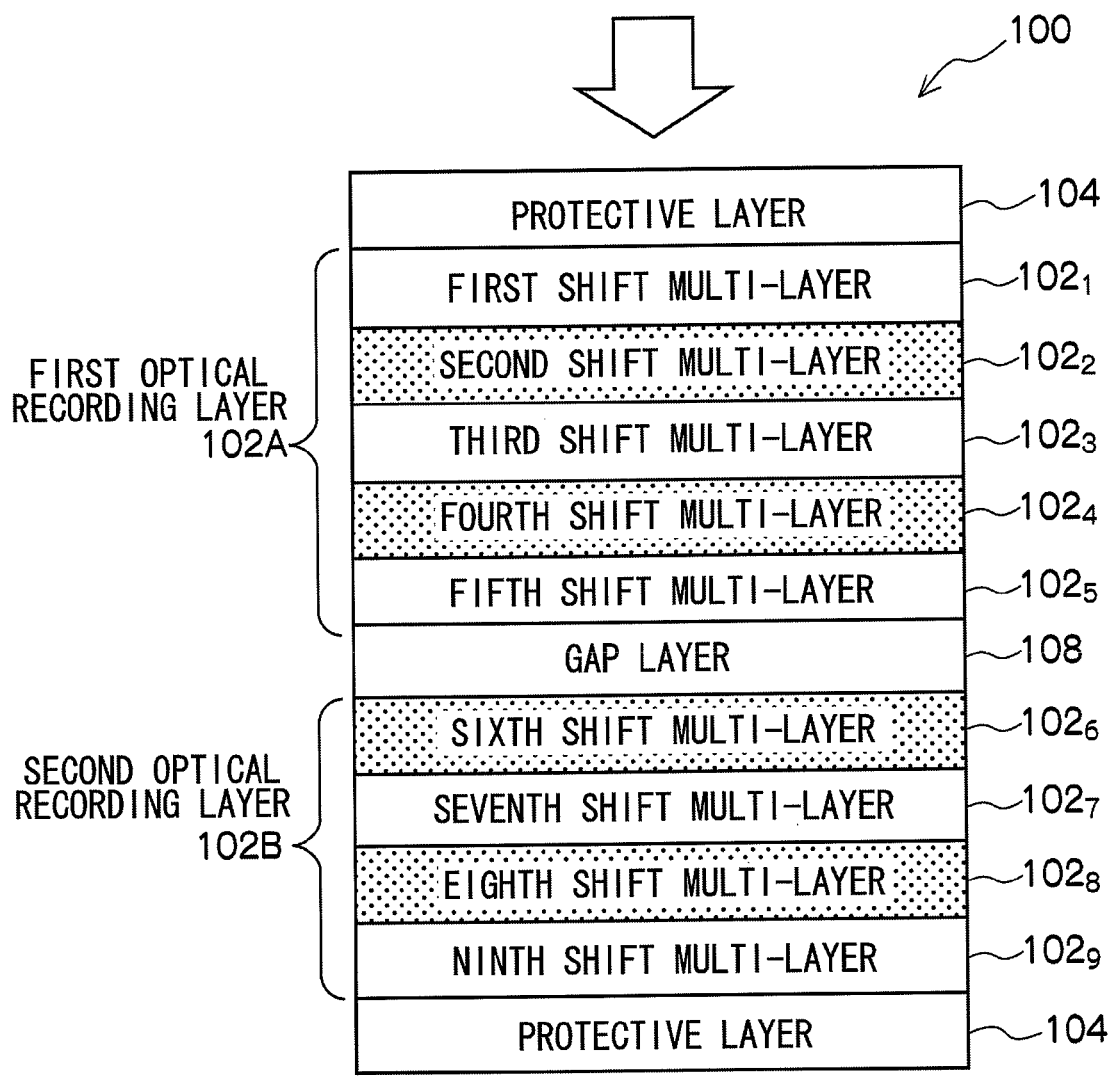
FIG. 14 is a partial cross-section showing a hologram recording medium layer configuration employed in a second exemplary embodiment of the present exemplary embodiment.

FIG. 14 is a partial cross-section showing a configuration of the hologram recording medium layer 100 employed in the second exemplary embodiment. The hologram recording medium 100 is provided with a first optical recording layer 102A configured from a material having a specific recording sensitivity $S_1$, and a second optical recording layer 102B configured from a material having a specific recording sensitivity $S_2$. The recording sensitivity $S_1$ is higher than the recording sensitivity $S_2$. The first optical recording layer 102A of high recording sensitivity is disposed more toward the recording light incident side than the second optical recording layer 102B of low recording sensitivity. A gap layer 108 is disposed between the first optical recording layer 102A and the second optical recording layer 102B. The first optical recording layer 102A, the second optical recording layer 102B, and the gap layer 108 are all sandwiched between a pair of protective layers 104.

Figure 15:
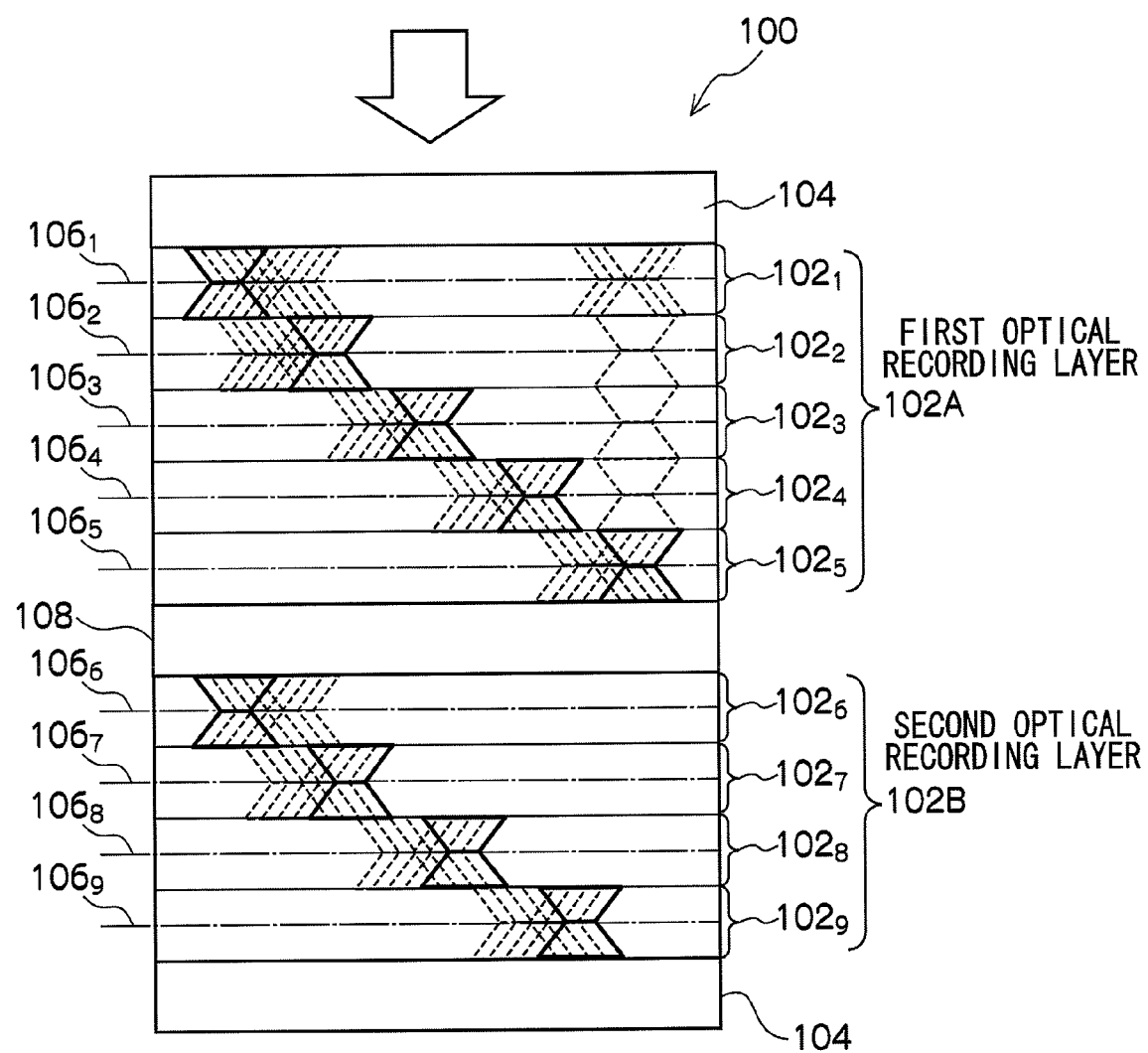
FIG. 15 is an explanatory diagram of a schedule-recording method of the second exemplary embodiment of the present invention.

There are five focal point positions $106_1$ to $106_5$ in the first optical recording layer 102A, as shown in FIG. 15, separated from each other by a distance of twice the hologram size, and accordingly multi-recording with five holograms stacked in the optical axis direction can be carried out without cross-talk. There are, in the same manner, four focal point positions $106_6$ to $106_9$ in the second optical recording layer 102B, separated from each other by a distance of twice the hologram size, and accordingly multi-recording with four holograms stacked in the optical axis direction can be carried out without cross-talk. A first shift multi-layer $102_1$ to a ninth shift multi-layer $102_9$ correspond to each of the focal point positions $106_1$ to $106_9$.

In the second exemplary embodiment, as shown in FIG. 15, a hologram is recorded by making recording light converge at one or other of the focal point positions $106_1$ to $106_9$ using a Fourier transform lens. Shift multi-recording is carried out, for example, in the first shift multi-layer $102_1$ to the fifth shift multi-layer $102_5$ of the first optical recording layer 102A with the same exposure conditions within each of the layers. In a similar manner shift multi-recording is carried out in the sixth shift multi-layer $102_6$ to the ninth shift multi-layer $102_9$ of the second optical recording layer 102B with the same exposure conditions within each of the layers. In this manner, shift multi-recording can thereby be performed within the same shift multi-layer using the desired designed exposure conditions. No complicated control is required when shift multi-recording is performed with the same exposure conditions. In contrast, stacked-layer multi-recording is performed with different exposure conditions between each of the first shift multi-layer $102_1$ to the fifth shift multi-layer $102_5$. In a similar manner, stacked-layer multi-recording is performed with different exposure conditions between each of the sixth shift multi-layer $102_6$ to the ninth shift multi-layer $102_9$ of the second optical recording layer 102B. In this manner, shift multi-recording can be carried out with different exposure conditions for each of the different shift multi-layers. The dynamic range is effectively utilized by performing stacked-layer multi-recording with different exposure conditions. It should be noted that any two or more of the shift multi-layers may have the same exposure conditions, depending on the sensitivity characteristics of the recording materials.

The first optical recording layer 102A of high recording sensitivity is exposed before the second optical recording layer 102B of low recording sensitivity. In this example, since the first optical recording layer 102A of high recording sensitivity is disposed further toward the recording light incident side (upper side) than the second optical recording layer 102B, exposure is first from the recording light incident side. The optical recording layer of high recording sensitivity is preferably disposed on the recording light incident side, as in this example. However, when the optical recording layer of lower recording sensitivity is disposed further to the recording light incident side than the optical recording layer of higher recording sensitivity, the optical recording layer of high recording sensitivity, which is the lower layer, is exposed first.

Each of the first shift multi-layer $102_1$ to the fifth shift multi-layer $102_5$ in the first optical recording layer 102A is exposed in sequence from the recording light incident side. Namely, exposure is performed in the sequence of the first shift multi-layer $102_1$, the second shift multi-layer $102_2$, the third shift multi-layer $102_3$, the fourth shift multi-layer $102_4$, and the fifth shift multi-layer $102_5$. In the same manner, each of the sixth shift multi-layer $102_6$ to the ninth shift multi-layer $102_9$ in the second optical recording layer 102B is exposed in sequence from the recording light incident (upper layer) side. Namely, exposure is performed in the sequence of the sixth shift multi-layer $102_6$, the seventh shift multi-layer $102_7$, the eighth shift multi-layer $102_8$, and the ninth shift multi-layer $102_9$.

FIG. 16 is a graph for explaining setting the multi-recording exposure conditions. In the second exemplary embodiment the recording sensitivity $S_1$ of the first optical recording layer 102A and the recording sensitivity $S_2$ of the second optical recording layer 102B are shown by the respective sensitivity curves, with the cumulative exposure amount on the horizontal axis (units: a.u.) and the M/# on the vertical axis. This graph also shows an example in which "M/#"=1.

The degree of stacking multiplicity $M_v$ of the first optical recording layer 102A is 5 in the second exemplary embodiment. When the dynamic range is divided into 5 equal portions in order to fully utilize the dynamic range with exposure 5 times in the stacking direction, the cumulative exposure amounts $e_1$ to $e_5$ for each layer of the first shift multi-layer $102_1$ to the fifth shift multi-layer $102_5$ are derived according to the recording sensitivity S. By so doing, shift multi-recording is performed with different exposure conditions between the shift multi-recording layers according to the recording sensitivity S. The in-plane degree of multiplicity is represented by $M_h$, and the exposure amount for each hologram in the layers of the first shift multi-layer $102_1$ to the fifth shift multi-layer $102_5$ are respectively $e_1/M_h$ to $e_5/M_h$. By so doing, shift multi-recording is performed with the same exposure conditions within the same shift multi-layer. It should be noted that each hologram within the same shift multi-layer may be allotted different exposure amounts.

The second optical recording layer 102B has a low sensitivity, but by the time exposure of the first optical recording layer 102A is completed, ⅕ of the dynamic range has already been used up. The second optical recording layer 102B therefore has a degree of stacking multiplicity $M_v$ of 4. By providing the second optical recording layer 102B of low recording sensitivity in addition to the first optical recording layer 102A of high recording sensitivity, the total degree of stacking multiplicity $M_v$ is 9. When the remaining dynamic range of the recording sensitivity $S_2$ is divided into 4 equal portions in order to fully utilize the dynamic range with exposure 4 times in the stacking direction, the cumulative exposure amounts $e_6$ to $e_9$ for each layer of the sixth shift multi-layer $102_6$ to the ninth shift multi-layer $102_9$ are derived according to the recording sensitivity $S_2$. Shift multi-recording is thereby performed with different exposure conditions between the shift multi-recording layers according to the recording sensitivity. The in-plane degree of multiplicity is represented by $M_h$, and the exposure amount for each hologram in the layers of the sixth shift multi-layer $102_6$ to the ninth shift multi-layer $102_9$ are respectively $e_6/M_h$ to $e_9/M_h$. By so doing, shift multi-recording is performed with the same exposure conditions within the same shift multi-layer. It should be noted that each holograms within the same shift multi-layer may be allotted different exposure amounts.

The degree of stacking multiplicity $M_v$ can be greatly increased by combining optical recording layers of different sensitivities and performing schedule recording as in the second exemplary embodiment, in comparison with recording with an optical recording layer formed from a single material. Namely, in the second exemplary embodiment the degree of stacking multiplicity $M_v$ is 5 in the optical recording layer of M/#=1, and were the optical recording layer to be formed from a single material it would be necessary to raise M/#. However, by performing schedule recording like that of the second exemplary embodiment, it is possible to raise the degree of stacking multiplicity $M_v$ to 9, by combining optical recording layers of M/#=1, having different sensitivities from each other.

Figure 17A:
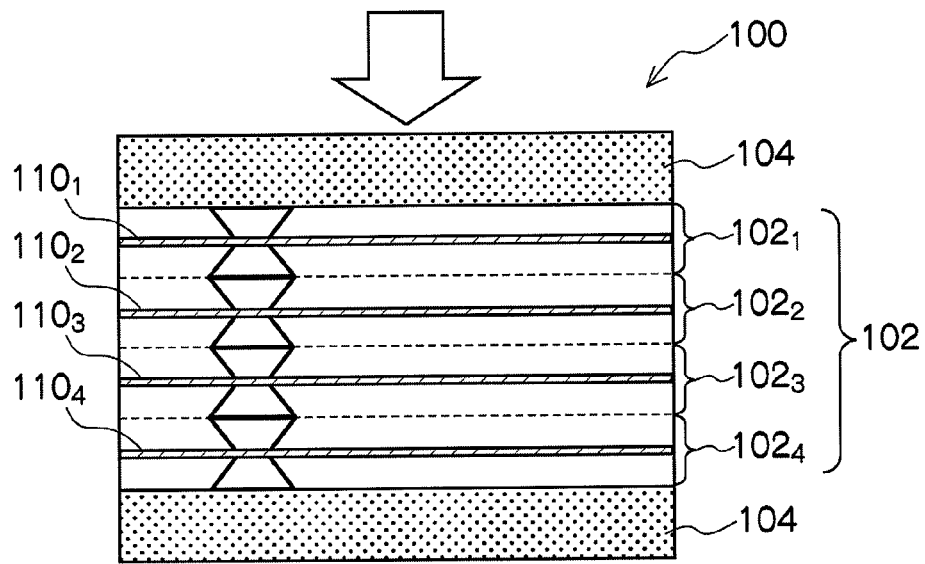
FIG. 17A to 17C are each cross-sections showing one example of a configuration of a hologram recording medium provided with selectively reflective layers.
Figure 17B:
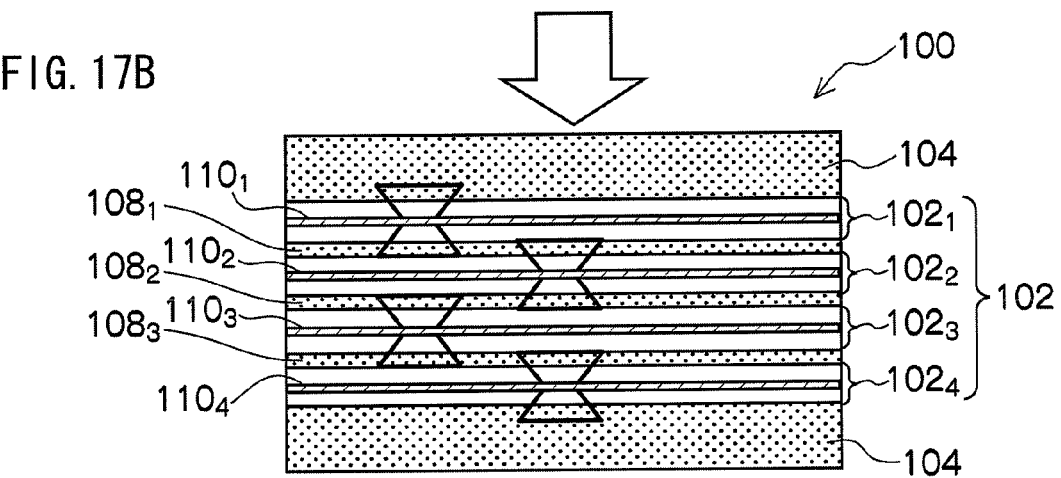
Figure 17C:
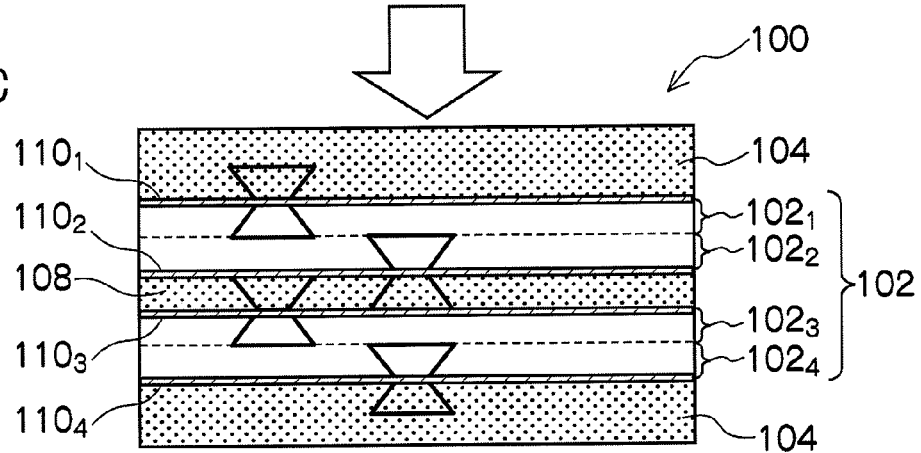

It should be noted that explanation has been given in the above exemplary embodiments of examples in which the focal point positions where recording light is made to converge are adjusted by movement amounts detected by a detector, however, an optical servo mechanism can be introduced for adjusting the position in the optical axis direction. When an optical servo mechanism is introduced, as shown in FIGS. 17A to 17C, selective refection layers $110_1$ to $110_4$ are provided at each of the focal point positions $106_1$ to $106_6$ of the hologram recording medium 100. The selective refection layers $110_1$ to $110_4$ are formed from thin layers of metals, such as Cu, Ag, Au, Al, or metal oxides, such as $SiO_2$, $Al_2O_3$, which are transparent to the recording light.

Figure 18:
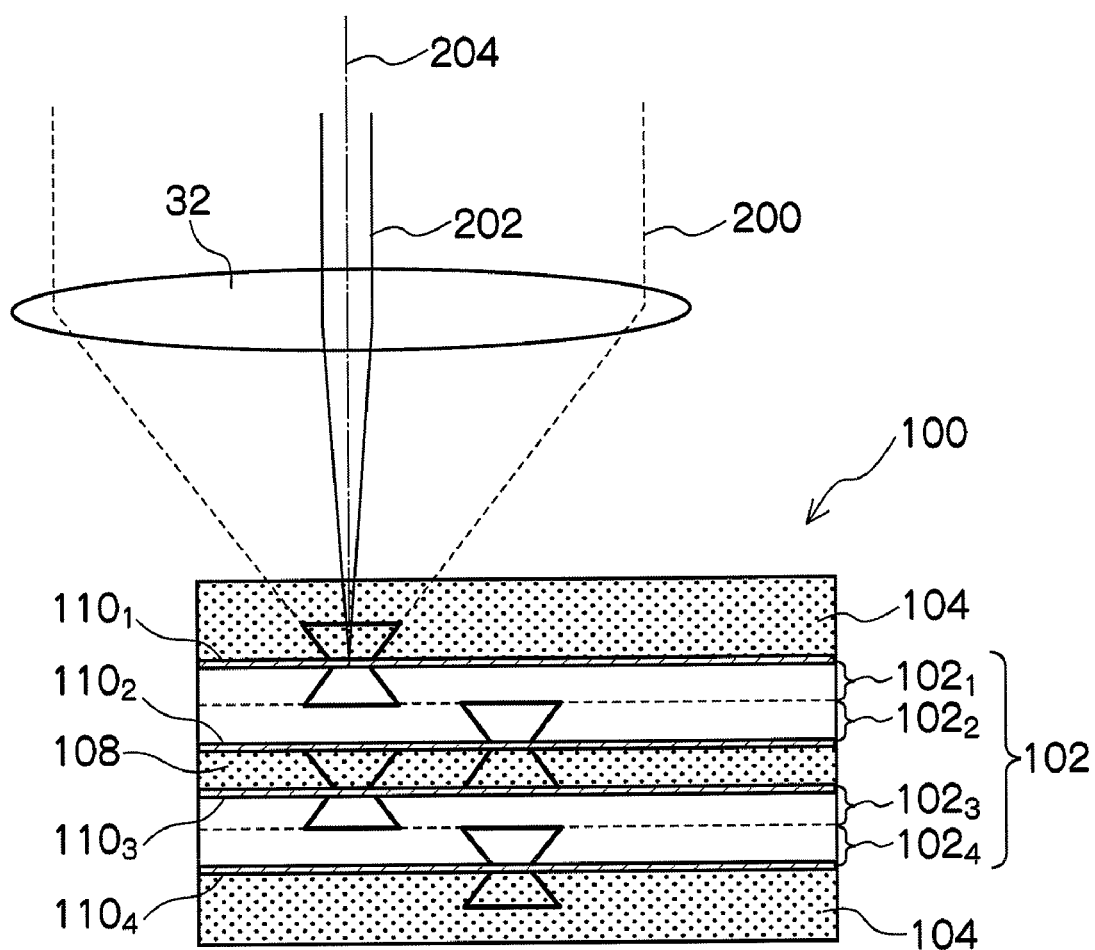
FIG. 18 is a diagram showing the manner in which a positioning laser is selectively reflected.

The selective refection layers $110_1$ to $110_4$, as shown in FIG. 18, selectively reflect a laser beam 202 (for example, a red semiconductor laser with wavelength 650 mm, referred to below as "a positioning laser beam") used as positioning light of wavelength different from that of the recording light 200. The positioning laser beam 202 used is one to which the material of the optical recording layers 102 of the hologram recording medium 100 shows a small sensitivity. The positioning laser beam 202 also passes through the recording light 200 and the optical axis 204.

Figure 19:
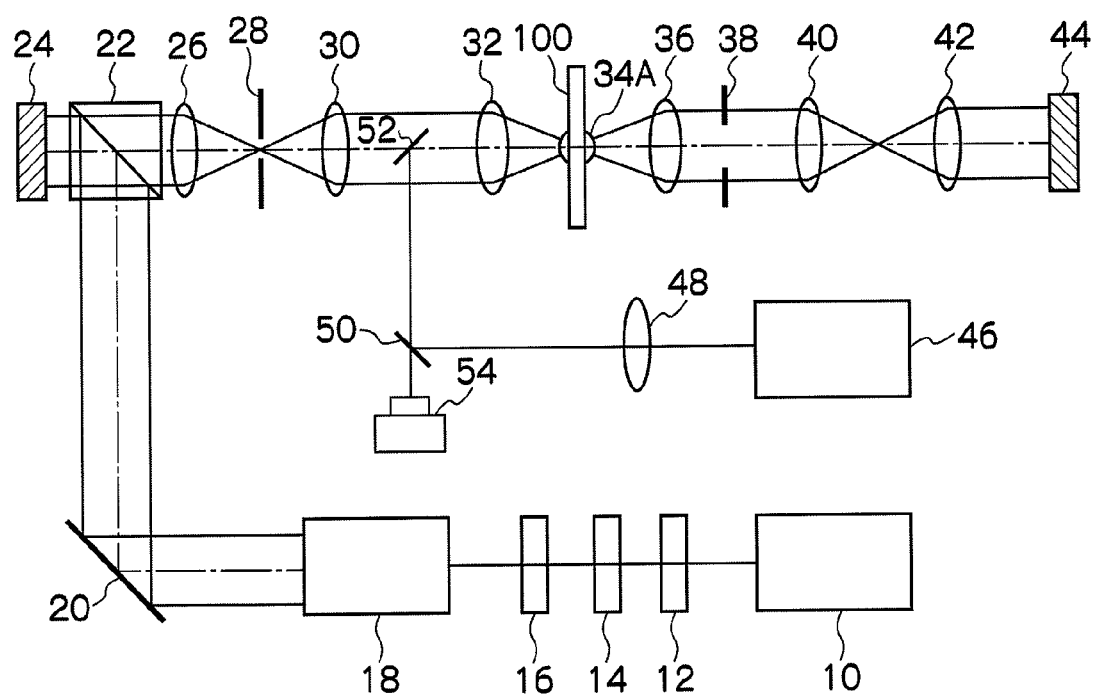
FIG. 19 is a schematic diagram showing a configuration of a hologram recording/reproduction device into which an optical servo has been introduced.

FIG. 19 is a schematic diagram showing a configuration of a hologram recording/reproduction device into which an optical servo has been introduced. Since the configuration thereof is similar to that of the hologram recording/reproduction device shown in FIG. 1, except in that the phase mask 31 has been removed and a later described servo mechanism has been introduced, and a recording medium positioning control unit 34A is provided in place of the moving mechanism 34, portions of the configuration that are similar to those of FIG. 1 have been allocated the same reference numerals and explanation thereof will be omitted.

The positioning laser beam 202 is radiated from a positioning laser beam source 46. The radiated positioning laser beam 202 is made into a parallel beam by a collimator 48. The parallel beam of the positioning laser beam 202 passes through a beam splitter 50, and is introduced into a dichroic mirror 52. The positioning laser beam 202 joins the same light path as that of the recording light at the dichroic mirror 52. The positioning laser beam 202 is then irradiated onto the hologram recording medium 100 and a portion of the positioning laser beam 202 is reflected by one or other of the selective refection layers $110_1$ to $110_4$. The reflected light from whichever of the selective refection layers $110_1$ to $110_4$ is reflected by the dichroic mirror 52 and the beam splitter 50, and light therefrom is received by a light receiving element 54. The light receiving element 54 then outputs a servo signal, based on the received reflected light, in order to control the focal point position of the recording light.

The hologram recording medium 100 is supported by the recording medium positioning control unit 34A. The recording medium positioning control unit 34A can move in the optical axis direction of the recording light. The recording medium positioning control unit 34A adjusts the position of optical axis direction based on the servo signal output from the light receiving element 54, and adjusts the separation distance between the hologram recording medium 100 and the Fourier transform lens 32. The convergence position where light is converged is thereby controlled with respect to the hologram recording medium 100. It should be noted that the positioning laser beam 202 may be irradiated from both sides of the hologram recording medium 100.

Explanation has been given in the above exemplary embodiments of examples in which multi-recording is carried out in the stacking direction under conditions such that cross-talk is not generated between the layers, however, overlapping shift multi-layers may be used as long as the obtained error rate therefrom is not of a level that causes problems in practice. Multi-recording is possible with the focal point position displaced by several μm in the optical axis direction by increasing the numerical aperture of the Fourier transform lens.

The foregoing description of the exemplary embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An optical recording device comprising:
   a light source, generating a signal beam and a reference beam radiating with the same optical axis from the same direction;
   a light-converging optical system, converging recording light that includes the signal beam and the reference beam to at least one optical recording layer of a transmission optical recording medium;
   a moving unit, moving a convergence position where the recording light is converged by the light-converging optical system relative to the transmission optical recording medium, such movement being relative movement in an in-plane direction of the transmission optical recording medium as well as relative movement in the optical axis direction;
   a detection unit, detecting the amount of movement from a convergence position reference position in the optical axis direction; and
   an acquisition unit, deriving, for each of a plurality of convergence positions in the optical axis direction, a cumulative exposure amount within a plane that includes the convergence position moved by the movement amount, the derivation of the cumulative exposure amount being based on the recording sensitivity of the optical recording layer and on the movement amount of the convergence position detected by the detection unit, and apportioning the cumulative exposure amount across all the pages of in-plane recording to acquire the light exposure amount for each page,
   wherein interference fringes from the recording light are shift multi-recorded as a plurality of pages of holograms within a plurality of planes corresponding to the plurality of convergence positions, based on the light exposure amount of each page acquired, by the acquisition unit, for each of the convergence positions.

2. The optical recording device according to claim 1, wherein shift multi-recording is performed within each of the plurality of planes corresponding to the plurality of convergence positions in sequence from the side on which the recording light is incident to the transmission optical recording medium.

3. The optical recording device according to claim 1, wherein shift multi-recording is performed within each of the plurality of planes corresponding to the plurality of convergence positions in sequence from the optical recording layer with the highest recording sensitivity when a plurality of optical recording layers with different recording sensitivities are provided in the transmission optical recording medium.

4. The optical recording device according to claim 1, wherein:
   when a plurality of optical recording layers with different recording sensitivities are provided in the transmission optical recording medium, the optical recording layers are disposed in sequence from the optical recording layer with the highest recording sensitivity from the recording light incident side where the recording light is incident to the transmission optical recording medium; and
   shift multi-recording is performed within each of the plurality of planes corresponding to the plurality of convergence positions in sequence from the side on which the recording light is incident to the transmission optical recording medium.

5. An optical recording method comprising:
   making recording light, which includes a signal beam and a reference beam radiated coaxially from the same direction, converge to at least one optical recording layer of a transmission optical recording medium using a light-converging optical system;
   moving a convergence position where the recording light is converged by the light-converging optical system relative to the transmission optical recording medium, such movement being relative movement in an in-plane direction of the transmission optical recording medium as well as relative movement in the optical axis direction;
   detecting the amount of movement from a convergence position reference position in the optical axis direction; and
   deriving, for each of a plurality of convergence positions in the optical axis direction, a cumulative exposure amount within a plane including the convergence position moved by the movement amount, the derivation of the cumulative exposure amount being based on the recording sensitivity of the optical recording layer and on the detected movement amount of the convergence position, apportioning the cumulative exposure amount across all the pages of in-plane recording to acquire the light exposure amount for each page,
   wherein interference fringes from the recording light are shift multi-recorded as a plurality of pages of holograms within a plurality of planes corresponding to the plurality of convergence positions, based on the light exposure amount of each page acquired for each of the convergence positions.

6. The optical recording method according to claim 5, wherein shift multi-recording is performed within each of the plurality of planes corresponding to the plurality of convergence positions in sequence from the side on which the recording light is incident to the transmission optical recording medium.

7. The optical recording method according to claim 5, wherein shift multi-recording is performed within each of the plurality of planes corresponding to the plurality of convergence positions in sequence from the optical recording layer with the highest recording sensitivity when a plurality of optical recording layers with different recording sensitivities are provided in the transmission optical recording medium.

8. The optical recording method according to claim 5, wherein:

when a plurality of optical recording layers with different recording sensitivities are provided in the transmission optical recording medium, the optical recording layers are disposed in sequence from the optical recording layer with the highest recording sensitivity from the recording light incident side where the recording light is incident to the transmission optical recording medium; and shift multi-recording is performed within each of the plurality of planes corresponding to the plurality of convergence positions in sequence from the side on which the recording light is incident to the transmission optical recording medium.

* * * * *